(Model.)
H. McDONALD.
FURNITURE CASTER.
No. 454,284. Patented June 16, 1891.
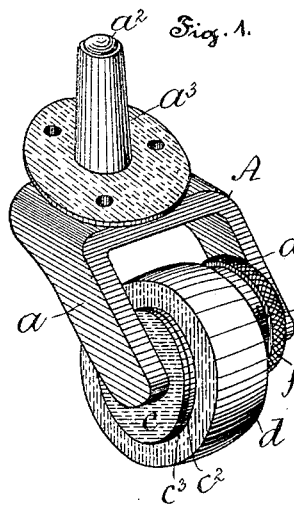
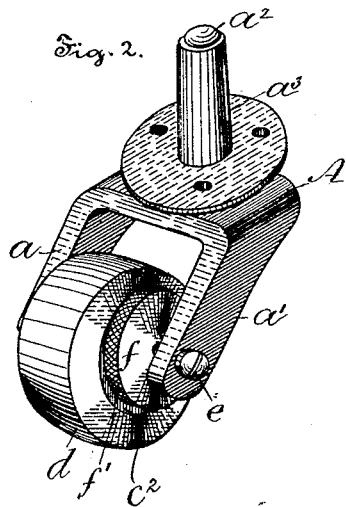
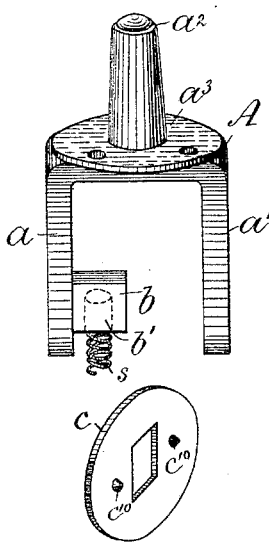
Witnesses:
Hermann Bormann.
Thomas M. Smith.
Inventor
Hugh McDonald,
by J. Walter Douglass.
Att'y.

UNITED STATES PATENT OFFICE.

HUGH McDONALD, OF WILLIAMSPORT, PENNSYLVANIA.

FURNITURE-CASTER.

SPECIFICATION forming part of Letters Patent No. 454,284, dated June 16, 1891.

Application filed March 7, 1891. Serial No. 384,078. (Model.)

*To all whom it may concern:*

Be it known that I, HUGH McDONALD, residing at Williamsport, in the county of Lycoming and State of Pennsylvania, have invented certain new and useful Improvements in Furniture-Casters, of which the following is a specification.

My invention relates to casters applicable to different kinds of furniture and provided with a roller or wheel susceptible of being shifted for permitting of the adjustment of the same to compensate for inequalities of a floor and in order that the article of furniture may stand steady and plumb.

The principal objects of my present invention are, first, to provide a simple, durable, and efficient caster having the wheel or rollers thereof arranged so as to be shifted with relation to the caster-frame and of being readily secured to position, so that the caster may be easily adjusted in order to provide for any inequalities of the floor, and thus permit the article of furniture to stand steady and rigid; second, to so construct and arrange the adjustable wheel or rollers and parts of the caster as that the same may be conveniently and economically applied to any of the usual and well-known forms of caster-frames.

My invention consists of a caster provided with horns having a movable carrier connected with one of said horns, a roller loosely fitted to said carrier, and means connected with the other of said horns for clamping and unclamping said carrier.

My invention further consists of the improvements in casters hereinafter fully described, and pointed out in the claims.

The nature and characteristic features of my invention will be more fully understood from the following description, taken in connection with the accompanying drawings, forming part hereof, and in which—

Figure 1 is a perspective view of a caster embodying features of my invention and showing a carrier movably connected with one of the arms or horns of the caster-frame and also showing a roller or wheel loosely fitted to said carrier. Fig. 2 is a similar view of the same, showing a threaded shank or spindle inserted through one of the horns of the caster and provided with a milled nut for clamping and unclamping the carrier; and Fig. 3 is a detached view of the caster illustrated in Figs. 1 and 2, showing the detail construction of the various parts thereof.

In the drawings, A is a main frame provided with arms or horns $a$ and $a'$. This frame A is represented in the drawings as provided with a pintle $a^2$ and cap $a^3$ for attaching the caster to an article of furniture; but the cap and pintle may, if preferred, be dispensed with. In such case the frame A may be attached to the furniture in any preferred manner.

$b$ is a lug provided with a recess $b'$ and attached to or formed integral with the horn $a$.

$c$ is a metal or other suitable washer, provided on the inner surfaces at suitable distances apart with spurs or small points $c^{10}$, for a purpose to be presently described.

$c^2$ is a carrier provided with a slot $c'$, adapted to engage the lug $b$, so as to afford the carrier $c^2$ a range of vertical movement with reference to the horn $a$ and frame A.

$s$ is a spiral spring, having one extremity thereof fitted into the recess $b'$ and the other extremity caused to contact with one of the ends of the slot $c'$ of the carrier $c^2$. This spring $s$ serves to retain the carrier $c^2$ normally in a depressed position. The periphery of the carrier $c^2$ is of circular form and is provided with a flange $c^3$, so as to form a journal-bearing for the wheel or roller $d$, which latter is preferably somewhat narrower than the carrier $c^2$. The end surface of the carrier $c^2$ is formed with ribs or indentations $c^5$, as clearly illustrated in Fig. 3, in order that when said carrier $c^2$ is brought into contact with the washer $c$, having the spurs or points $c^{10}$, the caster-wheel $d$ will be effectually prevented from slipping.

$e$ is a spindle attached to the horn $a'$ and provided with a threaded shank $e'$.

$f$ is a nut mounted on the stud $e$ and provided with a milled edge $f'$. This milled nut $f$ is adapted to be screwed toward or away from the horn $a'$ into or out of contact with the carrier $c^2$, thereby serving not only to clamp or unclamp the carrier, as required, without preventing or in anywise interfering with the freedom of movement of the roller or wheel $d$, as will be readily understood, but also serving to cause the washer $c$ to be maintained firmly in contact with the indented or ribbed end surface of the carrier $c^2$.

The mode of operation of the hereinabove described caster in application to an article of furniture is as follows: The milled nut $f$ is turned out of engagement with the carrier $c^2$, so that the spring $s$ forces the carrier $c^2$, and consequently the wheel or roller $d$, downward until the article of furniture stands level or plumb, whereupon the milled nut $f$ is turned into engagement with the carrier $c^2$, thus securing the same to place and insuring the stability of the article of furniture on the floor.

It will be obvious to those skilled in the art to which my invention appertains that modifications may be made in details thereof without departing from the spirit of the invention. For example, the spring $s$ may be dispensed with, or a thumb-screw may be employed instead of a milled nut, and hence I do not limit myself to the exact construction and precise arrangement of the parts as hereinbefore described; but,

Having thus described the nature and objects of my invention, what I claim as new, and desire to secure by Letters Patent, is—

1. A caster provided with horns, an adjustable carrier, a roller mounted thereon, and means, substantially as described, for engaging said carrier and clamping and unclamping the same, for the purposes set forth.

2. A caster provided with a fixed lug, a washer provided with points or spurs, a slotted carrier provided with end ribs or indentations engaging said lug, a wheel or rollers loosely fitted to said carrier, a spring interposed between said lug and carrier, and means for clamping and unclamping said carrier, substantially as and for the purposes set forth.

3. A caster provided with a fixed lug, a washer, a slotted carrier engaging said lug and washer, a wheel or rollers loosely mounted on said carrier, and means for clamping and unclamping said carrier, substantially as and for the purposes set forth.

4. A caster provided with a fixed lug, a washer, a slotted carrier engaging said lug and washer, a wheel or roller, a spring interposed between said lug and carrier, and a nut and spindle for clamping and unclamping said carrier, substantially as and for the purposes set forth.

5. A caster provided with horns, a lug attached to one of said horns, a metallic washer provided with spurs, a slotted carrier provided with a ribbed end surface and flanged periphery, a roller supported loosely on said carrier, a threaded spindle attached to the other of said horns, and a nut mounted on said spindle, substantially as and for the purposes set forth.

In witness whereof I have hereunto set my signature in the presence of two subscribing witnesses.

HUGH McDONALD.

Witnesses:
GEO. W. REED,
THOMAS M. SMITH.